US012074794B2

(12) United States Patent
Pan et al.

(10) Patent No.: US 12,074,794 B2
(45) Date of Patent: Aug. 27, 2024

(54) RECEIVER-BASED PRECISION CONGESTION CONTROL

(71) Applicant: Intel Corporation, Santa Clara, CA (US)

(72) Inventors: Rong Pan, Saratoga, CA (US); Pedro Yebenes Segura, San Jose, CA (US); Roberto Penaranda Cebrian, Santa Clara, CA (US); Robert Southworth, Chatsworth, CA (US); Malek Musleh, Portland, OR (US); Jeongkeun Lee, Los Altos, CA (US); Changhoon Kim, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 17/131,672

(22) Filed: Dec. 22, 2020

(65) Prior Publication Data

US 2021/0112002 A1 Apr. 15, 2021

Related U.S. Application Data

(60) Provisional application No. 63/057,046, filed on Jul. 27, 2020.

(51) Int. Cl.
*H04L 45/74* (2022.01)
*G06F 15/173* (2006.01)
(Continued)

(52) U.S. Cl.
CPC ........ *H04L 45/74* (2013.01); *G06F 15/17331* (2013.01); *H04L 45/38* (2013.01); *H04L 47/12* (2013.01)

(58) Field of Classification Search
CPC ........ H04L 45/74; H04L 45/38; H04L 47/12; G06F 15/17331
(Continued)

(56) References Cited

U.S. PATENT DOCUMENTS 9,961,022 B1 5/2018 Kahn et al.
10,873,532 B2 12/2020 Chang et al.
(Continued)

FOREIGN PATENT DOCUMENTS

KR 20200058994 A 5/2020

OTHER PUBLICATIONS

HPCC: High Precision Congestion Control (Year: 2019).*
(Continued)

*Primary Examiner* — Hermon Asres
(74) *Attorney, Agent, or Firm* — Essential Patents Group, LLP; Christopher K. Gagne

(57) ABSTRACT

Examples described herein relate to a network agent, when operational, to: receive a packet, determine transmit rate-related information for a sender network device based at least on operational and telemetry information accumulated in the received packet, and transmit the transmit rate-related information to the sender network device. In some examples, the network agent includes a network device coupled to a server, a server, or a network device. In some examples, the operational and telemetry information comprises: telemetry information generated by at least one network device in a path from the sender network device to the network agent.

20 Claims, 14 Drawing Sheets

(51) Int. Cl.
  *H04L 45/00* (2022.01)
  *H04L 47/12* (2022.01)
(58) Field of Classification Search
  USPC .......................................................... 709/238
  See application file for complete search history.

(56) References Cited

U.S. PATENT DOCUMENTS

| | | | |
|---|---|---|---|
| 10,873,533 B1* | 12/2020 | Ismailsheriff | ............ H04L 47/27 |
| 2005/0005021 A1 | 1/2005 | Grant et al. | |
| 2009/0055742 A1 | 2/2009 | Nordhagen | |
| 2009/0323526 A1 | 12/2009 | Pike et al. | |
| 2011/0261687 A1 | 10/2011 | Armstrong et al. | |
| 2014/0126357 A1 | 5/2014 | Kulkarni et al. | |
| 2014/0164641 A1* | 6/2014 | Ye | .......................... H04L 47/127 |
| | | | 709/235 |
| 2015/0016247 A1 | 1/2015 | Hayes et al. | |
| 2017/0083319 A1 | 3/2017 | Burger et al. | |
| 2017/0134497 A1 | 5/2017 | Harter et al. | |
| 2017/0339075 A1 | 11/2017 | Arad | |
| 2018/0083878 A1 | 3/2018 | Francini et al. | |
| 2018/0219786 A1 | 8/2018 | Li et al. | |
| 2019/0044861 A1* | 2/2019 | Wandler | ................... H04L 47/12 |

OTHER PUBLICATIONS

International Search Report and Written Opinion for PCT Patent Application No. PCT/US20/66983, Mailed Apr. 8, 2021, 9 pages.
Zihao Wei et al., 'Measuring the Coexistence Competitiveness of ECN- or RTT-Based ExpresPass and TCP in Data Centers', In: 2019 IEEE Intl Conf on Parallel & Distributed Processing with Applications, Big Data & Cloud Computing, Sustainable Computing & Communications, Social Computing & Networking (ISPA/BDCloud/SocialCom/SustainCom), Mar. 26, 2020, 8 pages.
"What is the ECN (Explicit Congestion Notification) flag within a TCP header used for?", Checkpoint, https://supportcenter.checkpoint.com/supportcenter/portal?eventSubmit_doGoviewsolutiondetails=&solutionid=sk40661, lasat modified Mar. 27, 2019, 1 page.
Li, Yuliang, et al., "HPCC: High Precision Congestion Control", ACM, https://dl.acm.org/doi/10.1145/3341302.3342085, Aug. 19, 2019, 15 pages.
International Preliminary Report on Patentability from PCT/US2020/066983 notified Feb. 9, 2023, 6 pgs.
Final Office Action from U.S. Appl. No. 16/108,661 notified Apr. 14, 2020, 18 pgs.
International Preliminary Report on Patentability from PCT/US2019/021459 notified Feb. 11, 2021, 9 pgs.
International Search Report and Written Opinion from PCT/US2019/021459 notified May 24, 2019, 9 pgs.
Non-Final Office Action from U.S. Appl. No. 16/108,661 notified Sep. 6, 2019, 17 pgs.
Notice of Allowance from U.S. Appl. No. 16/108,661 notified Aug. 19, 2020, 9 pgs.
"BCM 88690 StrataDNX 10 Tb/s Switching Device", Broadcom 2018, 2 pgs.
"BCM88690 Packet Processing", Programming Guide, Broadcom, Jan. 24, 2023, 847 pgs.
"BCM88850 StrataDNX 14.4 Tb/s Scalable Switching Device", Broadcom 2020, 2 pgs.
"Broadcom Ships Jericho2: Driving the Merchant Silicon Revolution in Carrier Networks", Broadcom, 23 pgs.
"Broadview Analytics", Application for Advanced Network Telemetry and Analytics, Broadcom 2018, 2 pgs.
"Broadview Instrumentation Agent", Specification Software Release 3.3, Broadcom, Nov. 15, 2018, 160 pgs.
"In-band Telemetry", Broadcom Product Brief, 2017, 4 pgs.
"In-band Telemetry (INT) Dataplane Specification", Version 2.0, The P4.org Applications Working Group, Feb. 14, 2020, 36 pgs.
Brockners, et al., "Data Fields for In-situ OAM draft-ietf-ippm-ioam-data-09", Mar. 2020, 85 pgs.
Chlnnl, Bhaskar, "Broadcom's next-generation Inband Telemetry solution designed for Hyperscale Datacenters is here", <https://www.broadcom.com/blog/broadcoms-next-generation-inband-telemetry-solution-designed-for-the-hyperscale-datacenters-is-here> Apr. 27, 2020, 4 pgs.
Kumar, et al., "Inband Flow Analyzer draft-kumar-ippm-ifa-00", Oct. 18, 2018, 49 pgs.
Kumar, et al., "Inband Flow Analyzer draft-kumar-ippm-ifa-01", Feb. 21, 2019, 72 pgs.
Lapukhov, et al., "Data-plane probe for in-band telemetry collection draft-lapukhov-dataplane-probe-01", Jun. 2016, 26 pgs.
Extended European Search Report from European Patent Application No. 20947688.6 notified Mar. 22, 2024, 10 pgs.
Basat, Ran Ben, et al., "PINT: Probabilistic In-Band Network Telemetry", arXiv:2007.03731v1 [cs.NI], Jul. 7, 2020, 20 pgs.
Liu, H., et al., "HPCC++: Enhanced High Precision Congestion Control draft-pan-tsvwg-hpccplus-00", Network Working Group, Internet—Draft, Intel Corporation, Jun. 17, 2020, 15 pgs.
Extended European Search Report from European Patent Application No. 24177198.9 notified Jul. 9, 2024, 13 pgs.

* cited by examiner

```
11: function ComputeWind(U, updateWc)
12:   if U >= η or incStage >= maxStage then
13:     W = W^c/(U/η) + W_AI;
14:     if updateWc then
15:       incStage = 0; W^c = W;
16:   else
17:     W = W^c + W_AI;
18:     if updateWc then
19:       incStage++; W^c = W;
20:   return W;
21: procedure NewAck(ack)
22:   if ack.seq > lastUpdateSeq then
23:     W = ComputeWind(MeasureInflight(ack), True);
24:     lastUpdateSeq = snd_nxt;
25:   else
26:     W = ComputeWind(MeasureInflight(ack), False);
27:   R = W/τ; L = ack.L;
```

```
402
T: update interval; lastNP: last NP time;
last_np_W: window at the lastNP time;

Procedure NewINT(int.L)
  if now > (lastNP+T) then
    W = ComputeWind(MeasureInflight(int.L), True);
    lastUpdate = now;
    send_np(int.L, W);
  else
    W = ComputeWind(MeasureInflight(int.L), False);
    if (W changed +X% from last_ack_W) then
      send_np(int.L, W);
```

FIG. 4

RECEIVER-BASED PRECISION CONGESTION CONTROL

RELATED APPLICATION

This application claims the benefit of priority of U.S. Provisional application 63/057,046, filed Jul. 27, 2020. The contents of that application are incorporated in its entirety herein.

DESCRIPTION

Datacenter networks simultaneously deliver high throughput, ultra-low latency and network stability in order to meet the requirements of state-of-the-art applications. Congestion control plays a key role in achieving these stringent performance demands. However, existing congestion control algorithms have inherent limitations for reaching these goals.

BRIEF DESCRIPTION OF THE DRAWINGS

FIG. 4 depicts an example of pseudocode that can be performed at a receiver to determine when to send a notification packet (np).

DETAILED DESCRIPTION

Figure 1:
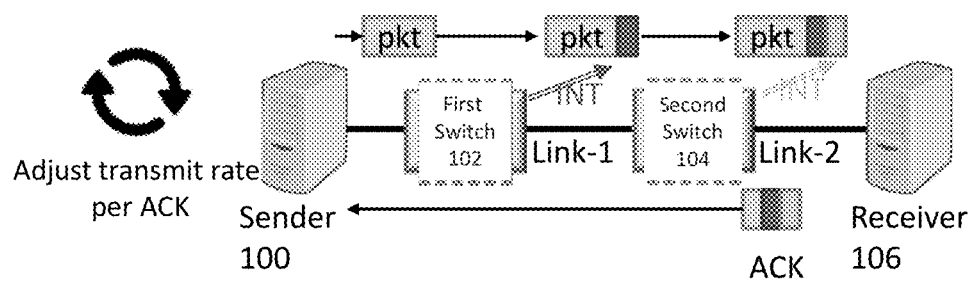
FIG. 1 depicts an example of a High Precision Congestion Control (HPCC) compatible system.

High Precision Congestion Control (HPCC) is an example technique that can be used to provide congestion control. An example of HPCC is described at least in Li et al., "HPCC: High Precision Congestion Control" SIG-COMM (2019). HPCC leverages in-network telemetry (INT) to obtain precise link load information and controls traffic precisely. HPCC addresses challenges such as delays in INT information propagation during congestion and overreaction to information provided in INT. In theory, use of HPCC can utilize free bandwidth while avoiding congestion and can maintain near-zero in-network queues for ultra-low latency.

Various examples of in-network telemetry are described in: Internet Engineering Task Force (IETF) draft-kumar-ippm-ifa-01, "Inband Flow Analyzer" (February 2019); "In-band Network Telemetry (INT) Dataplane Specification, v2.0," P4.org Applications Working Group (February 2020); IETF draft-lapukhov-dataplane-probe-01, "Data-plane probe for in-band telemetry collection" (2016); and IETF draft-ietf-ippm-ioam-data-09, "In-situ Operations, Administration, and Maintenance (IOAM)" (Mar. 8, 2020). In-situ Operations, Administration, and Maintenance (IOAM) records operational and telemetry information in the packet while the packet traverses a path between two points in the network. IOAM discusses the data fields and associated data types for in-situ OAM. In-situ OAM data fields can be encapsulated into a variety of protocols such as NSH, Segment Routing, Geneve, IPv6 (via extension header), or IPv4.

Examples of operational and telemetry information include one or more of:

| | |
|---|---|
| Timestamp | Absolute timestamp in seconds (e.g., nanosecond or 10 nanosecond increments) that specifies the time at which the packet was received by a network element (e.g., switch, router, network interface). |
| Timestamp | Absolute timestamp that specifies the time at which the packet was received by the network element. Can indicate timestamp at receipt at one or more network device or switch along a packet path from sender to endpoint receiver or transmission from one or more network device or switch along a packet path from sender to endpoint receiver. Can be measured in subseconds or any interval. |
| Transit delay | Time the packet spent in the transit network element. |
| Queue depth | Indicates the current length of the egress interface queue of the network element from which the packet is forwarded. Can indicate queue length or depth in which a packet is or was stored in at an intermediate network device or switch in a path of a packet to the endpoint receiver |
| Buffer occupancy | Indicates the current status of the occupancy of the common buffer pool used by a set of queues in a network element. |
| Bytes sent | Number of bytes received for a packet flow or flows at a queue at an intermediate network device or switch in a path of a packet to the endpoint receiver |

According to various embodiments, telemetry information can be used to identify congestion at switches along a path from a sender to receiver.

FIG. 1 depicts an example of an HPCC compatible system. Sender 100 sends a packet (pkt) to first switch 102. First switch 102 can insert an inband network telemetry (INT) or in-network telemetry information related to first switch 102 into packet header(s) of the packet. First switch 102 sends the packet with INT information inserted by first 102 switch to second switch 104. Second switch 104 inserts its own inband network telemetry (INT) information or in-network telemetry to the packet header(s) of the packet. Second switch 104 sends the packet with inserted INT information of first switch 102 and second switch 104 to receiver 106. More than two switches or other network elements (e.g., network interface configured to operate as a forward element) can be used.

Receiver 106 receives the packet with the inserted INT information. Receiver 106 echoes (e.g., sends a copy) INT information to sender 100 in an acknowledge (ACK) packet. An ACK packet can include echoed INT information and packet acknowledgement (packet-ack) acknowledging that the packet was received by receiver 106 and the packet is not in flight anymore. Sender 100 can adjust packet transmit rate based on the accumulated INT information in ACKs considering the worst case scenario such as worst congestion level present and experienced through first switch 102 and second switch 104 (or other switches or devices along a path from sender 100 to receiver 106). A worst congestion level present and experienced through first switch 102 and second switch 104 (or other switches or devices along a path from sender 100 to receiver 106) can be a highest level of transit delay of any switch in the path, highest level of queue depth of any switch in the path, highest level of buffer occupancy of any switch in the path.

HPCC may experience challenges with performance and design feasibility. First, HPCC requires receivers to send back per-packet ACKs in order to echo the INT information back to senders. This could cause a very high packet-per-second overhead at receiver NICs, to a point where the receivers might have less processing capacity to process data packets. Note that even if INT information is not included in each ACK, per-packet ACK itself can be a large overhead that affects the receiver NIC's processing power. Sending ACK per received packet can create packet processed per second (PPS) pressure at the receiver and some receivers (e.g., receiver network interface cards) may reduce a rate at which ACKs are generated and transmitted in order to maintain packet per second transmission rate of non-ACK packets.

The HPCC design can put pressure on the PPS capacity required to implement HPCC at the receiver NICs. NICs/Smart NICs may not have the extra capacity to achieve the PPS transmission rates required for ACK or data packet (or other packet) transmission.

In some cases, flow fairness is to be achieved whereby if multiple flows are experiencing the same congestion level in the same congestion point and apply a similar injection rate, sharing the available bandwidth (e.g., transmit rates) in a fair manner occurs. Under HPCC, some flows may never achieve their fair share due to an additive-increase parameter (Wm) used to adjust bandwidth depending on a statically configured value for an estimation of number of flows.

For example, $W_{AI}$ can be configured as $W_{init}(1-\eta)/N$, where:
$W_{init}$ is the bandwidth-delay product,
$\eta$ is the target utilization, and
N=maximum number of flows expected to flow through the switch path.

A flow can be a sequence of packets being transferred between two endpoints, generally representing a single session using a known protocol. Accordingly, a flow can be identified by a set of defined T tuples and, for routing purpose, a flow can be identified by tuples that identify the endpoints, e.g., the source and destination addresses. For content based services (e.g., load balancer, firewall, intrusion detection system etc.), flows can be identified at a finer granularity by using five or more tuples (e.g., source address, destination address, IP protocol, transport layer source port, and destination port). A packet in a flow is expected to have the same set of tuples in the packet header.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer.

In order to avoid large swings due to the rates' additive-increase, this parameter can be set conservatively assuming the maximum number flows exist in the network. However often times, there are only a few flows sharing a network's bottlenecked link. As a result, the additive-increase amount is not big enough to bring fairness among these flows. For example, data center networks often have incast degree that can vary from 1000 to 1. For example, N can be set to 1000 to avoid large swings of rate increases (N*W_AI). However, in short intervals of time, if there is an incast of only 2 flows, the additive-increase value would be too small to bring bandwidth allocation fairness.

In some examples, INT information received at the sender can be used to adjust a transmit rate for one or more flows. The sender can calculate a transmit rate based on information in received INT information in ACK packets. The sender can apply flow fairness determination to adjust the transmit rate of packets through the first switch and second switch or other switches or devices in the switch path.

According to various embodiments, the receiver has INT information that a packet has experienced during network element traversal and instead of echoing INT information back to one or more senders, the receiver can determine a transmit rate for packets that traverse a path of one or more switches or devices and send a window or rate calculation per RTT or when there is a large change (e.g., greater than a threshold level of change) in congestion levels to the sender. In some examples, the receiver can determine a transmit rate for packets that traverse a path of one or more switches or devices and send a window or rate calculation per flow or flows to the sender. In some examples, the receiver can also send received INT information to the sender. Various embodiments could drastically reduce the amount of the traffic (e.g., lower packet rate or fewer packets/second and data) on the reverse paths from receiver to sender and reduce the packet per second (PPS) pressure that the receiver NICs experience that are consistent with HPCC. In some examples, a receiver can send a flow pause to a sender and indicate a priority level of a pause command and the priority can correlate with a time amount to pause the flow.

Various embodiments of receiver-based (Rx-based) HPCC can reduce drastically the PPS overhead to make it feasible for HPCC-consistent receiver NICs or Smart NICs to achieve desired PPS transmission rates. Various embodiments of Rx-based HPCC can enable small flows to finish faster as each flow is allowed to send full a bandwidth-delay-product worth of data in a first RTT. For long flows that last more than one RTT, various embodiments provide that an equal share of the remaining bandwidth can be allocated to flows.

Another potential benefit associated with reduced feedback to a sender is that the receiver may not send all received INT headers to the sender, which could be a large amount of traffic depending on the number of hops that the data packet traversed. Various embodiments could reduce the number of feedbacks, ACKs or notification packets, generated by the receiver. Hence, neighboring or concurrent traffic can be less susceptible to the overhead of transit of HPCC INT. It is shown that a reduction in ACKs has minimal impact to performance when compared against baseline HPCC.

According to various embodiments, a switch or network device in a path of one or more switches and or network devices can determine a transmit rate for packets that traverse a path of one or more switches and send back only the window/rate calculation per RTT or when there is a large change in congestion levels. In some examples, a switch or device in the path can determine that it is the most congested link and replace the congestion information in the packet header with its own. Accordingly, a packet that traverses multiple switches can include INT information of the most congested switch. Such an operation to determine a maximum congested switch or network device could be performed by switches or network devices. In some examples, a packet that traverses a path to an endpoint receiver includes congestion information of the most congested switch and a switch or network device removes any INT information that does not correspond to a most congested switch or network device. For example, congestion can refer to queue levels being over filled, time of traversal through the switch or network device (e.g., latency) being above a level, packet drops exceeding a level, or transmit rates from an egress port being less than a level.

In some systems, as described earlier, a number of actual flows through a switch path to the receiver (N) is not known a priori, and is to be set conservatively. Otherwise, $N*W_{AI}$ could cause large swings in network load. However, a smaller value of WAT can lead to fairness issues when number of actual flows is small (e.g., <<N). In some examples, the receiver has accurate information about the number of flows sharing a congested receiver link. In some embodiments, instead of statically setting conservative additive-increase parameter, the receiver can apply an Rx-based scheme to measure a number of flows that it receives in a time interval and dynamically adjust the $W_{AI}$ value to reflect current network situations or usage. In some embodiments, a receiver can determine the number of actual flows through a switch path to the receiver (N), instead of the sender estimating N. A processor or circuitry to determine N and transmit rate can be in a receiver NIC or server connected to the receiver NIC. In some embodiments, a switch or network device in a path from sender to receiver can determine a number of flows sharing a congested receiver link and provide the information to the receiver or sender.

Various embodiments attempt to address and improve the fairness aspect of HPCC, which is a key performance metric for congestion control in data centers. In some examples, a receiver dynamically determines or sets $W_{AI}$ (additive-increase (AI) parameter). In some examples, network operators can but do not have to configure the AI parameter. In addition, achieving fairness can be more likely to occur, because the number of flows is not assumed or static and a real number of flows could be used so that bandwidth can be allocated with more knowledge about the network status to adjust transmit rates in a better or fairer way to flows impacted by congestion. The improvement could allow flows to quickly converge to fairness without causing large swings in transmit rate under heavy load.

Another potential advantage of dynamic setting of additive-increase (AI) parameter ($W_{AI}$) is that it implies fairness among receiver nodes (or, optionally, cores), not just among flows. A receiver may receive packets from a few large flows, or many small flows. Each node (e.g., a server node) can be allocated the same fair rate since the flow rates will converge to be proportional to the AI amounts. The dynamic AI setting feature could allocate each receiver a total AI according to its link bandwidth, which is then divided among however many flows the node is receiving (N).

Figure 2:
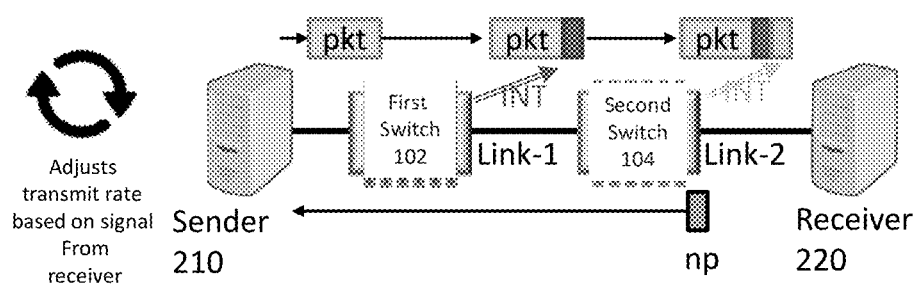
FIG. 2 depicts an example system that uses receiver-based HPCC to set a transmit rate of a sender.

FIG. 2 depicts an example system that uses receiver-based HPCC to set a transmit rate or window of a sender. Receiver 220 can receive incoming packet traffic from sender 210 via a switch path that includes switches 102 and 104. In this example, received packet traffic can include some or all accumulated INT from switches 102 and 104. Receiver 220 can perform transmit rate calculation based on a worst congestion at a switch in switch path (or network element path). In some examples, receiver 220 can determine a transmit rate for packets in a flow or remote direct memory access (RDMA) queue pair (QP). Examples of RDMA protocols include InfiniBand, Internet Wide Area RDMA Protocol (iWARP), quick UDP Internet Connections (QUIC), RDMA over Converged Ethernet (RoCE). Receiver 220 can send a notification packet (np) to sender 210 that includes one or more of: a transmit rate for at least one flow, window_size (W), $W_{AI}$, or other information. In some examples, an np can include transmit rates, window sizes, or $W_{AI}$ values for two or more flows.

In some examples, if transmit rate decision making is performed at receiver 220, different priority levels can be assigned to different senders. For example, receiver 220 can prioritize sender A over sender B where sender A has a higher priority than sender B and use the same switch path).

At least in fabric or network congestion scenarios (e.g., conveyed in the INT information), receiver 220 potentially can feedback the number of flows through the congested link (e.g. N) to sender 210. In some examples, receiver 220 can send acknowledgements of any received packets in a notification packet (np). Acknowledgement of a received packet can include at least an indication of a source sender and destination receiver network address. In some examples, receiver 220 can send at least one acknowledgement separate from np such as where the timing of np transmission and acknowledgement sending do not occur at the same time or within a timespan.

Various embodiments of receiver 220 can execute the procedure NewINT(int.L) in 402 of FIG. 4 every time a packet with data is received at receiver 220 or after some other number of packets received at receiver 220. Execution of procedure NewINT(int.L) in 402 of FIG. 4 can determine when receiver 220 is to send an np to sender 210.

Example description of variables of procedure NewINT:
T: update interval (RTT);
lastNP: last NP time;
last_np_W: window at the lastNP time;
int.L is the array of link feedbacks in the INT header; and
W is window size and is a result of the HPCC algorithm.
    A formula to determine window_size (W) is shown in FIG. 4, lines 11-20. In some examples, W is calculated in the function NewINT (FIG. 4) by calling function ComputeWind.

In some examples, procedure send_np can be called from the NewINT procedure every interval T (e.g., the update period/interval that is set to RTT). The following pseudocode of procedure send-np can represent an operation of receiver 220 to send window_size W to sender 210.
Procedure send_np(int.L, W)
  np.seq=int.seq;
  np.W=W;
  lastNP=now; and
  last_np_W=W.
Field int.L can be the data packet information (e.g., INT header). For example, in this procedure, sequence information is used in order to acknowledge that a given data packet was received.

The following provides an example of a procedure to determine a number of flows (N) that traverse a path with one or more congested switches or network devices.

---

Procedure measureNFlow(T, packet) // calculate actual N number flows
  if (packet.id is new) then
    N++;
  if now > (lastNP+T) then
    if check_idle_flow( ) == TRUE then;
      N--;

---

Based on a received notification packet (np) from receiver 220 (e.g., one or more of: a transmit rate, window_size (W), $W_{AI}$, or other information), sender 210 can apply or determine a transmit rate for a flow. For example, the following pseudocode can represent an operation of sender 210 in response to receipt of an np from receiver 220.

Procedure receive_np(np)
    W=np.W;//W=window. Can be calculated by receiver
    R=np.W/T;/sender 210 applies R=transmit rate=window/RTT In some embodiments, receiver 220 calculates the W but the transmit rate (R) can be obtained from W as R=W/T. The value of T can be a constant in some examples. Accordingly, in some examples, sender 210 can calculate a transmit rate (R)=window_size (W)/RTT.

The following process can be used by sender 210 to set or adjust a transmit rate based on inflight bytes and a packet size. A transmit rate can be set to R except if (inflightByte+packet.size)>=W, the transmit rate can be set to a minimum rate.

---

Procedure sendData_chk(W, packet)
    if (inflightByte +packet.size) >=W
        send_data_at_minimum_rate; // otherwise rate = R

*Note
that the initial window, $W_{init}$, could be set to bandwidth-delay-product, where delay could include baseline RTT plus the update period T.

---

Figure 3:
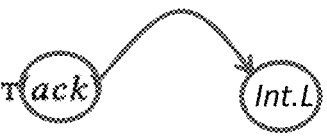
FIG. 3 depicts an example of a procedure that a receiver can perform.

FIG. 3 depicts an example of a procedure that a receiver can perform. The receiver can perform the procedure using received INT information, int.L. Various embodiments can potentially provide receiver-based HPCC that achieves similar low latency and high throughput performance as the original HPCC but with much less feedback packets sent to a sender and reduced number of constructions of an ack packet for the int.L information. Calculation of the transmit rate or window_size (W) at the receiver can be more accurate because a receiver calculates rate on INT information that was just received instead of sending the INT information to the sender, which can lead to calculation of transmit rate based on outdated congestion information. In some examples, a receiver has a better knowledge about the number of flows N than a transmitter.

FIG. 4 depicts an example of pseudocode that can be performed at a receiver to determine when to send a notification packet (np). The receiver can determine a W value and perform the pseudocode to determine when to send an np. As shown, the receiver can send an np every round trip time (RTT) or when a sudden congestion level change. A sudden congestion level change can be +/−X % change from a prior W value (last_ack_W).

The following process can be applied by the receiver to determine a window_size W.

---

Procedure NewINT(int.L)
    if now > (lastNP+T) then
        W = ComputeWind(MeasureInflight(int.L), True);
        lastUpdate = now;
        send_np(int.L, W);
    else
        W = ComputeWind(MeasureInflight(int.L), False);
        if (W changed +/−X% from last_ack_W) then
            send_np(int.L, W).

In this example:

--- now: current time;
T: update interval;
lastNP: last NP time;
last_np_W: window at the lastNP time;

---

The endpoint receiver can perform congestion control of packets or flows of packets from a sender. For example, the endpoint receiver can send to the sender one or more of: (1) estimated numbers of active flows using a queue at an intermediate network device or switch in a path of a packet to the endpoint receiver or a queue at the endpoint receiver; (2) total depth of the queue for a port for one more traffic classes (TCs); (3) remaining available buffer space for the queue; or (4) wait time of a packet in a queue prior to egress or transmission or being scheduled for transmission.

In some examples, the endpoint receiver can inform the sender to adjust a transmit rate of a packet or packets or packets of a flow by requesting one or more of: (1) rate of transmit rate increase or transmit rate decrease; (2) maximum permitted transmit rate; (3) target transmit rate; or (4) initial transmit rate, to be used after an idle, or for new flows on the same path. In some examples, the endpoint receiver can request the sender to change a path of the flow to avoid one or more network device and to avoid a congested link in the interior of the fabric.

In some examples, the endpoint receiver can determine a policy for scheduling, transport and congestion controls for the sender and the intermediate forwarding devices. The receiver can select best policy based on collective application demands and real time network information, and the sender and other network devices that can form a path between a transmitter and receiver can execute the policy. A policy can be applied for one packet, multiple packets, or a flow of packets. The endpoint receiver can communicate the policy to the sender in one or more packets, which can propagate the policy in one or more packets to one or more intermediate nodes.

In some examples, a receiver can determine an aggregated view of transmission demands from multiple senders and make a policy-level decision for one or multiple senders and intermediate network devices and switches to apply. For example, a packet scheduling policy can be determined by the receiver and sent to one or multiple senders and intermediate network devices and switches to apply. For example, an endpoint receiver could determine a segment routing and retransmission policy, which balance latency, throughput, and fault-tolerance.

Figure 5:
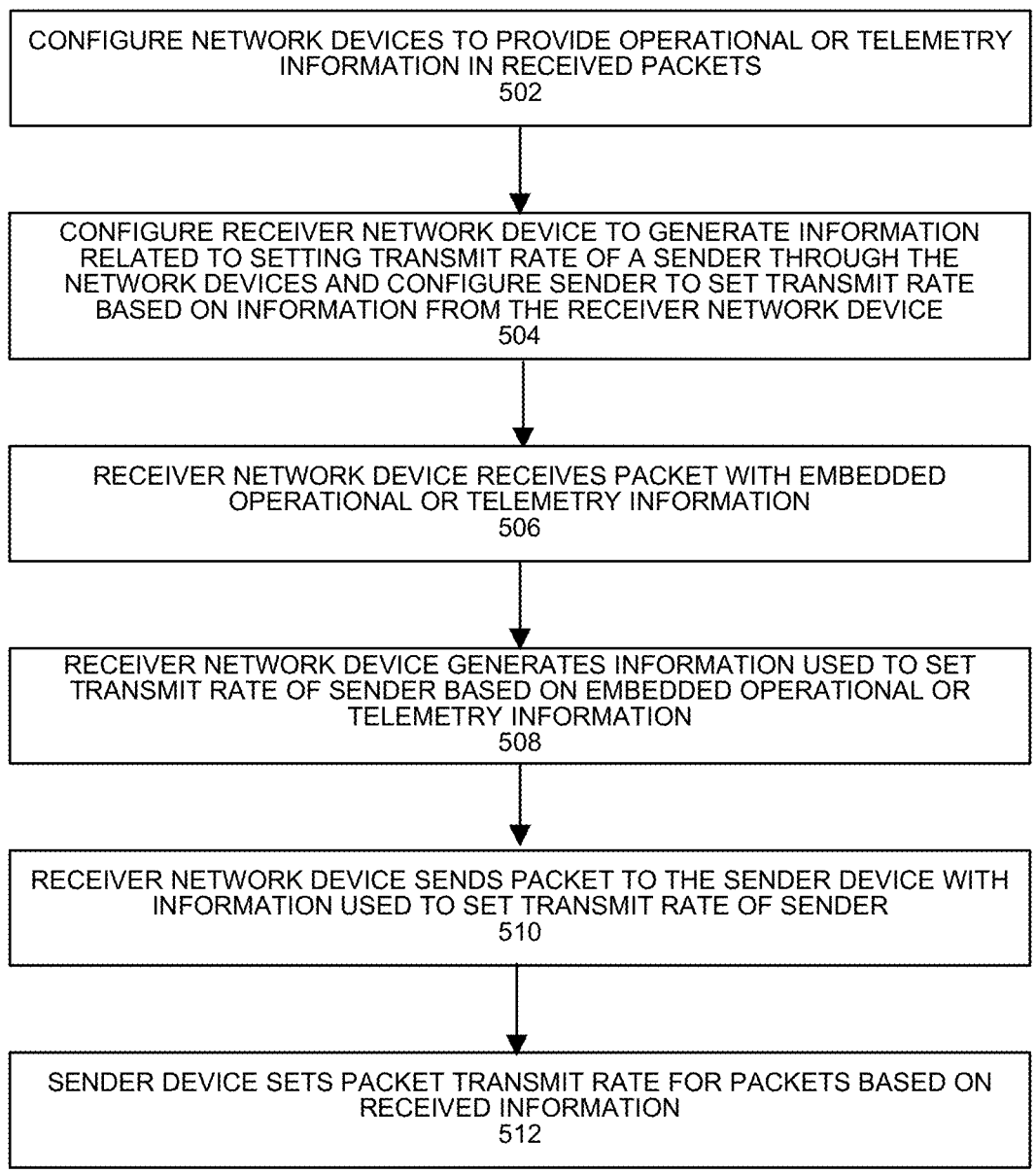
FIG. 5 depicts an example process.

FIG. 5 depicts an example process. The process can be performed by a sender network device, one or more intermediary network devices along a path from a sender network device to a receiver network device, and a receiver network device. At 502, network devices that provide forwarding operations of packets can be configured to add operational and telemetry information into received packets in accordance with High Precision Congestion Control (HPCC), which can achieve the aforementioned performance goals. See for example Li et al., "HPCC: High Precision Congestion Control" SIGCOMM (2019); as well as "Inband Flow Analyzer," (February 2019) and "Dataplane probe for in-band telemetry collection" (draft-lapukhov-dataplane-probe-01) (2016) and IETF standard In-situ Operations, Administration, and/or Maintenance (IOAM) (draft-ietf-ippm-ioam-data-09) (Mar. 8, 2020).

At 504, a receiver network device can be configured to generate information related to setting a transmit rate of a sender device for packets of one or more flows or RDMA queue pairs. The sender device can be configured to set a transmit rate of packets of one or more flows or RDMA queue pairs based on information sent by the receiver network element. At 506, a receiver network device can receive one or more packets with embedded operational or telemetry information. The sender device may have sent the one or more packets through the network elements that provide forwarding operations of packets. Intermediary network devices in a path from the sender to receiver network device can combine operational or telemetry information with the one or more packets. Examples of operational or telemetry information are described earlier.

At 508, the receiver network device can generate information useful for a sender network device to set a transmit rate of packets of one or more flows or RDMA queue pairs. The one or more flows or RDMA queue pairs can include communications between the sender and receiver network devices. For example, the information can include one or more of: a window size (W), a transmit rate of packets in one or more flows or RDMA queue pairs, additive-increase (AI) parameter (Wm) of one or more flows or RDMA queue pairs, or identification of a number of actual flows, N, the receiver device received through a congested path.

At 510, the receiver network device sends, to the sender network device, at least one packet with the information useful for a sender network device to set a transmit rate of packets. For example, the receiver network device can send the at least one packet with information at a time window interval (e.g., RTT) or sufficiently large change in window_size (W).

At 512, the sender network device can set a transmit rate of packets in one or more flows or RDMA queue pairs based on the received information. For example, the received information may specify a transmit rate and the sender can apply the transmit rate. For example, the received information may specify an additive increase or window size, and the receiver device can determine the transmit rate of packets in one or more flows or RDMA queue pairs based on the additive increase parameter or window size. Examples of determination of transmit rate based on window size are described herein. Thereafter, the sender can send packets in one or more flows or RDMA queue pairs at the transmit rate, which may or may not be different than a prior applied transmit rate.

Figure 6:
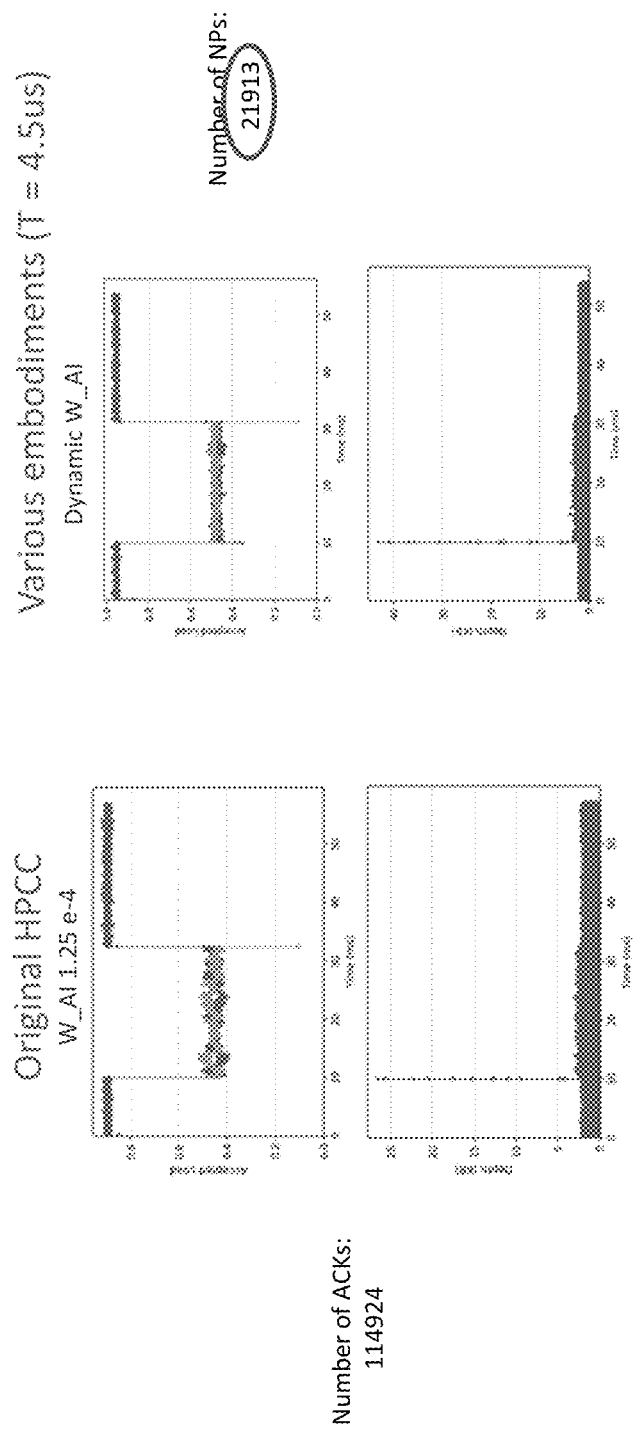
FIGS. 6-8 show experimental results.
Figure 7:
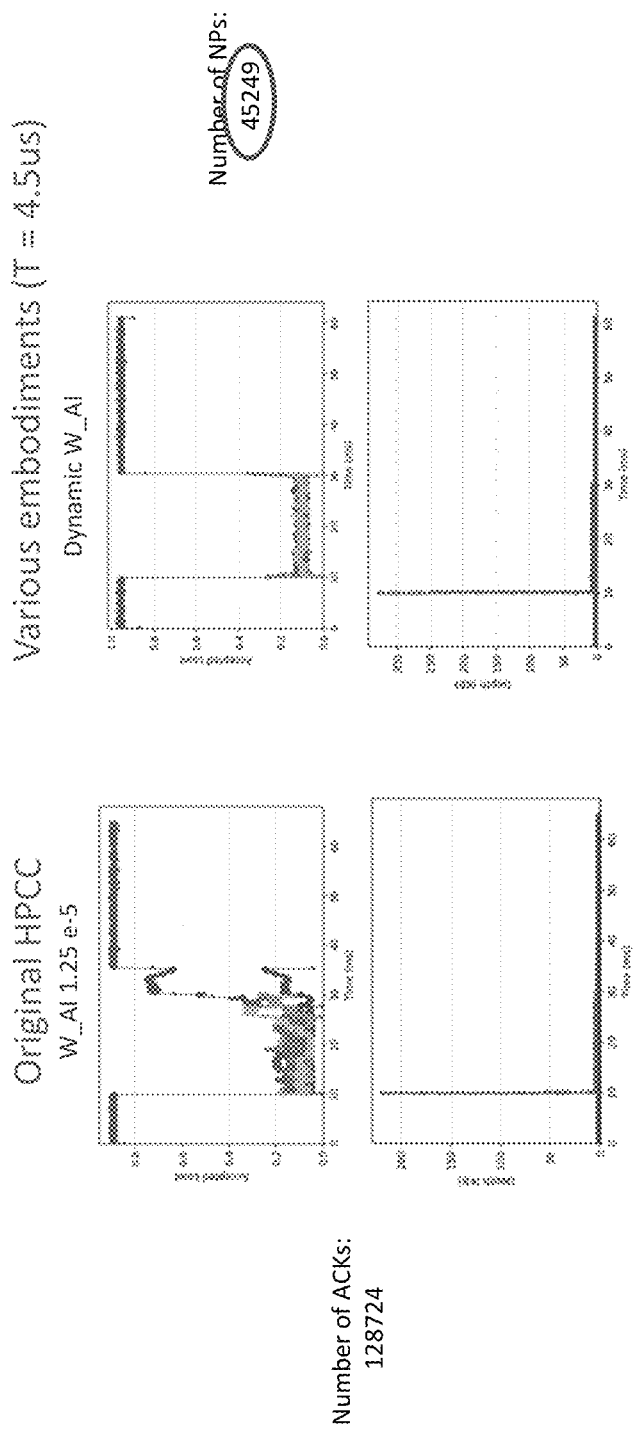
Figure 8:
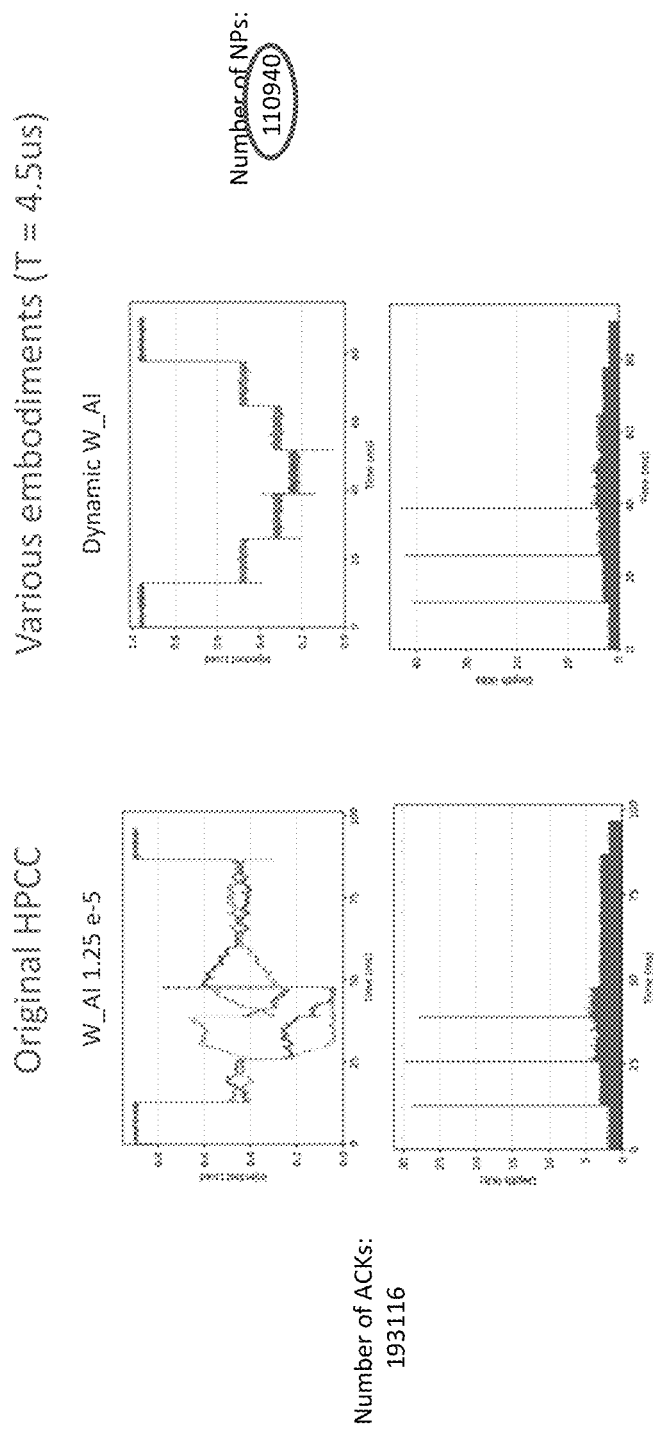

FIGS. 6-8 show experimental results. Performance comparation are shown for injection bandwidth, output queue depth, and fairness among flows. The following scenarios are tested: 2-to-1 in-cast, 8-to-1 in-cast, and flow come and go. The following experimental configurations can be used.
Network: 2-stage fat tree
NICs: 25 Gbps
SW: 100 Gbps
RTT: 8.5 us
   HPCC settings
   Max stage=5
   Base RTT=9 us
   Target utilization (T_uti)=0.95
   Additive increase (W_AI)
   (128 Mbps) (N=10)
   (12.8 Mbps) (N=100)
   Dynamic
   Change rate threshold=25%
   Notification period: 4.5 us According to the results of FIGS. 6-8, compared to HPCC, Rx-based HPCC can use much less feedback from receiver to sender, similar transient behavior can occur, and improved fairness among flows can occur.

Figure 9:
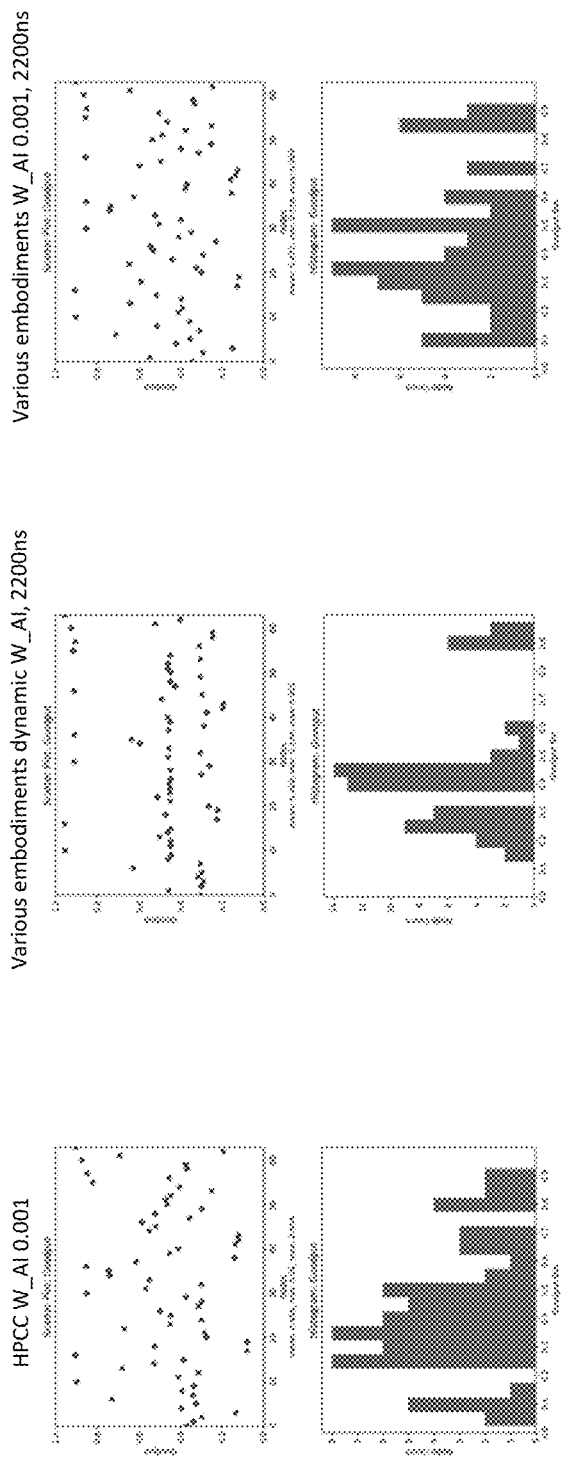
FIG. 9 depicts an example of experimental results for the following parameters.

FIG. 9 depict examples of experimental results for the following parameters:
Network: 2-stage fat tree
NICs: 200 Gbps (0.2 flits per ns)
SWs: 200 Gbps
RTT: 2 us
HPCC settings
Max stage=5
Base RTT=2200 ns
   Target utilization (T_uti)=0.95
   Additive increase (W_AI)
   0.0001 flits per ns (128 Mbps) (N=100)
   0.001 flits per ns (1280 Mbps) (N=10)
Change rate threshold=25%
Notification period:
   1100 ns, 2200 ns As shown in FIG. 9, dynamic setting of W_AI using Rx-based HPCC can improve fairness of bandwidth allocation to flows through a congested path over HPCC.

Figure 10:
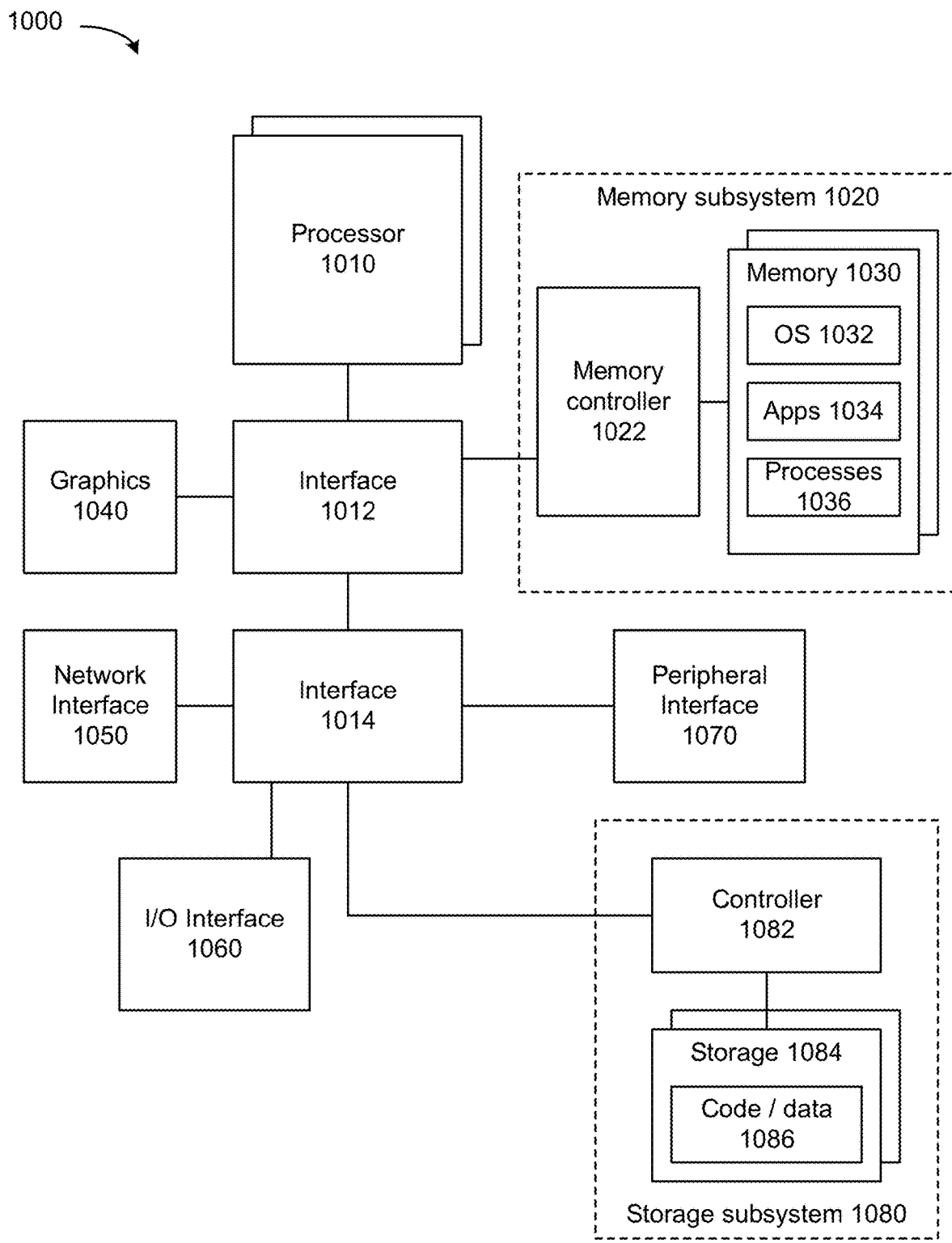
FIG. 10 depicts an example system.

FIG. 10 depicts a system. The system can use embodiments described herein to determine and transmit information used to set a transmit rate or window of a sender network device. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function offload engine that can be accessed or used by a processor 1010. Accelerators 1042 can be coupled to processor 1010 using a memory interface (e.g., DDR4 and DDR5) or using any networking or connection standard described herein. For example, an accelerator among accelerators 1042 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

In some examples, processor 1010 can execute a device driver (not depicted) for network interface 1050. OS 1032 can determine capabilities of network interface 1050 from the device driver. For example, OS 1032 can receive an indication of capabilities of network interface 1050 to determine and transmit information used to set a transmit rate of a sender network device. OS 1032 can request the device driver to enable or disable network interface 1050 to perform any of the capabilities described herein. In some examples, OS 1032, itself, can enable or disable network interface 1050 to perform any of the capabilities described herein. OS 1032 can provide requests (e.g., from an application 1034) to network interface 1050 to utilize one or more capabilities of network interface 1050. For example, any of applications 1034 can request use or non-use of any capabilities described herein by network interface 1050. In some examples, a datacenter administrator can configure network interface 1050 to perform any of the capabilities described herein.

In some examples, OS 1032 can determine a capability of a device associated with a device driver. For example, OS 1032 can receive an indication of a capability of a device (e.g., network interface 1050) to configure a NIC 1050 to perform any of the capabilities described herein (e.g., network interface 1050 perform transmit rate determination or a window). OS 1032 can request a driver to enable or disable network interface 1050 to perform any of the capabilities described herein. In some examples, OS 1032, itself, can enable or disable network interface 1050 to perform any of the capabilities described herein. OS 1032 can provide requests (e.g., from an application or VM) to network interface 1050 to utilize one or more capabilities of NIC 1050. For example, any application can request use or non-use of any of capabilities described herein by NIC 1050.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 1050 can receive data from a remote device, which can include storing received data into memory. Various embodiments can be used in connection with network interface 1050, processor 1010, and memory subsystem 1020.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory can involve refreshing the data stored in the device to maintain state. One example of dynamic volatile memory incudes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects between components can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 11:
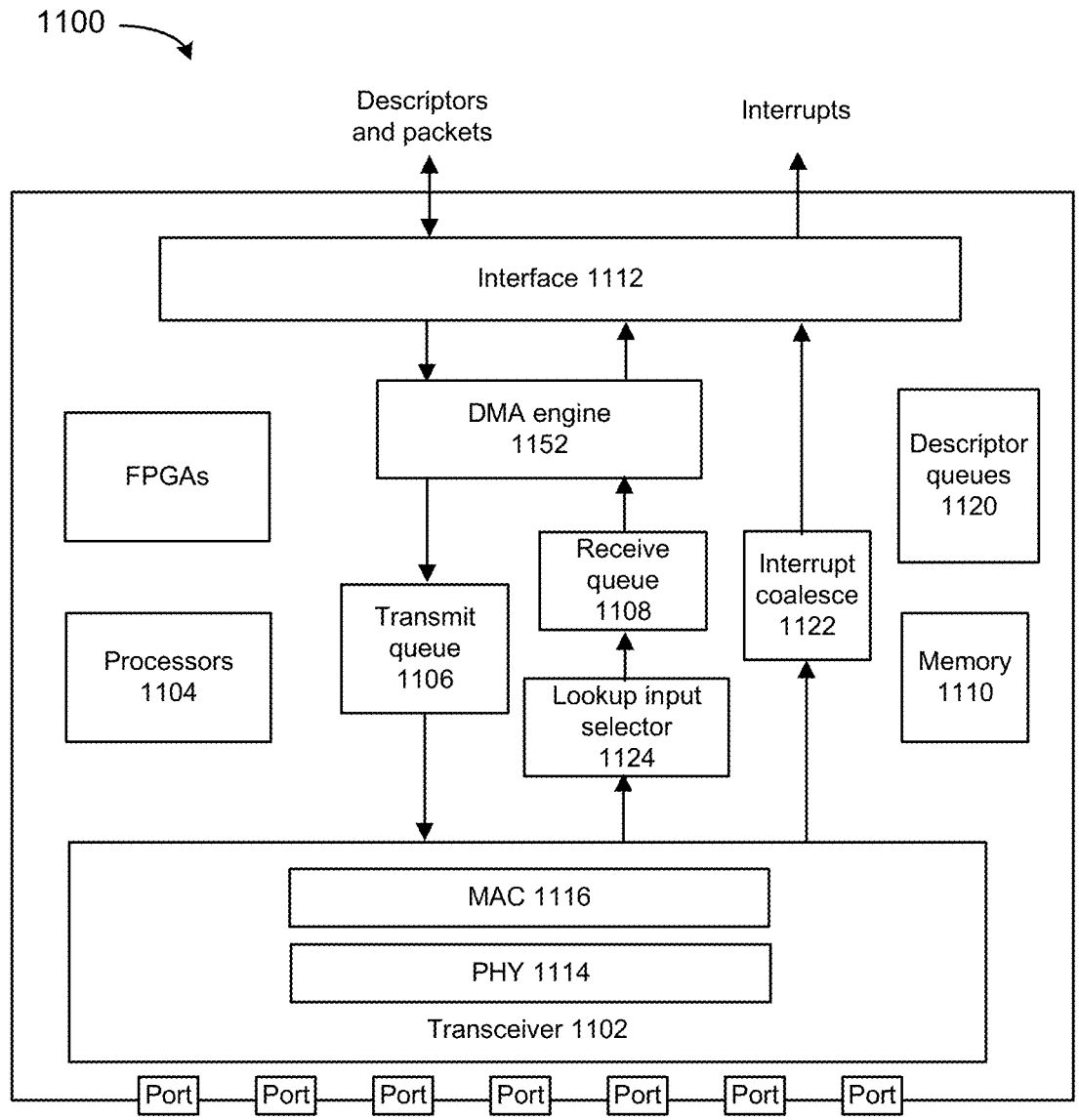
FIG. 11 depicts a network interface that can use embodiments or be used by embodiments.

FIG. 11 depicts a network interface that can use embodiments or be used by embodiments. Various resources in the network interface can determine and transmit information used to set a transmit rate or window of a sender network device in accordance with embodiments described herein. In some examples, network interface 1100 can be implemented as a network interface controller, network interface card, a host fabric interface (HFI), or host bus adapter (HBA), and such examples can be interchangeable. Network interface 1100 can be coupled to one or more servers using a bus, PCIe, CXL, or DDR. Network interface 1100 may be embodied as part of a system-on-a-chip (SoC) that includes one or more processors, or included on a multichip package that also contains one or more processors.

Some examples of network device 1100 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1100 can include transceiver 1102, processors 1104, transmit queue 1106, receive queue 1108, memory 1110, and [bus]] interface 1112, and DMA engine 1152. Transceiver 1102 can be capable of receiving and transmitting packets in conformance with the applicable protocols such as Ethernet as described in IEEE 802.3, although other protocols may be used. Transceiver 1102 can receive and transmit packets from and to a network via a network medium (not depicted). Transceiver 1102 can include PHY circuitry 1114 and media access control (MAC) circuitry 1116. PHY circuitry 1114 can include encoding and decoding circuitry (not shown) to encode and decode data packets according to applicable physical layer specifications or standards. MAC circuitry 1116 can be configured to perform MAC address filtering on received packets, process MAC headers of received packets by verifying data integrity, remove preambles and padding, and provide packet content for processing by higher layers. MAC circuitry 1116 can be configured to assemble data to be transmitted into packets, that include destination and source addresses along with network control information and error detection hash values.

Processors 1104 can be any a combination of a: processor, core, graphics processing unit (GPU), field programmable gate array (FPGA), application specific integrated circuit (ASIC), or other programmable hardware device that allow programming of network interface 1100. For example, processors 1104 can provide for identification of a resource to use to perform a workload and generation of a bitstream for execution on the selected resource. For example, a "smart network interface" can provide packet processing capabilities in the network interface using processors 1104.

Packet allocator 1124 can provide distribution of received packets for processing by multiple CPUs or cores using timeslot allocation described herein or RSS. When packet allocator 1124 uses RSS, packet allocator 1124 can calculate a hash or make another determination based on contents of a received packet to determine which CPU or core is to process a packet.

Interrupt coalesce 1122 can perform interrupt moderation whereby network interface interrupt coalesce 1122 waits for multiple packets to arrive, or for a time-out to expire, before generating an interrupt to host system to process received packet(s). Receive Segment Coalescing (RSC) can be performed by network interface 1100 whereby portions of incoming packets are combined into segments of a packet. Network interface 1100 provides this coalesced packet to an application.

Direct memory access (DMA) engine 1152 can copy a packet header, packet payload, and/or descriptor directly from host memory to the network interface or vice versa, instead of copying the packet to an intermediate buffer at the host and then using another copy operation from the intermediate buffer to the destination buffer.

Memory 1110 can be any type of volatile or non-volatile memory device and can store any queue or instructions used to program network interface 1100. Transmit queue 1106 can include data or references to data for transmission by network interface. Receive queue 1108 can include data or references to data that was received by network interface from a network. Descriptor queues 1120 can include descriptors that reference data or packets in transmit queue 1106 or receive queue 1108. Interface 1112 can provide an interface with host device (not depicted). For example, interface 1112 can be compatible with PCI, PCI Express, PCI-x, Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers and switches, fog network elements, and/or hybrid data centers (e.g., data center that use virtualization, cloud and software-defined networking to deliver application workloads across physical data centers and distributed multi-cloud environments).

Figure 12A:
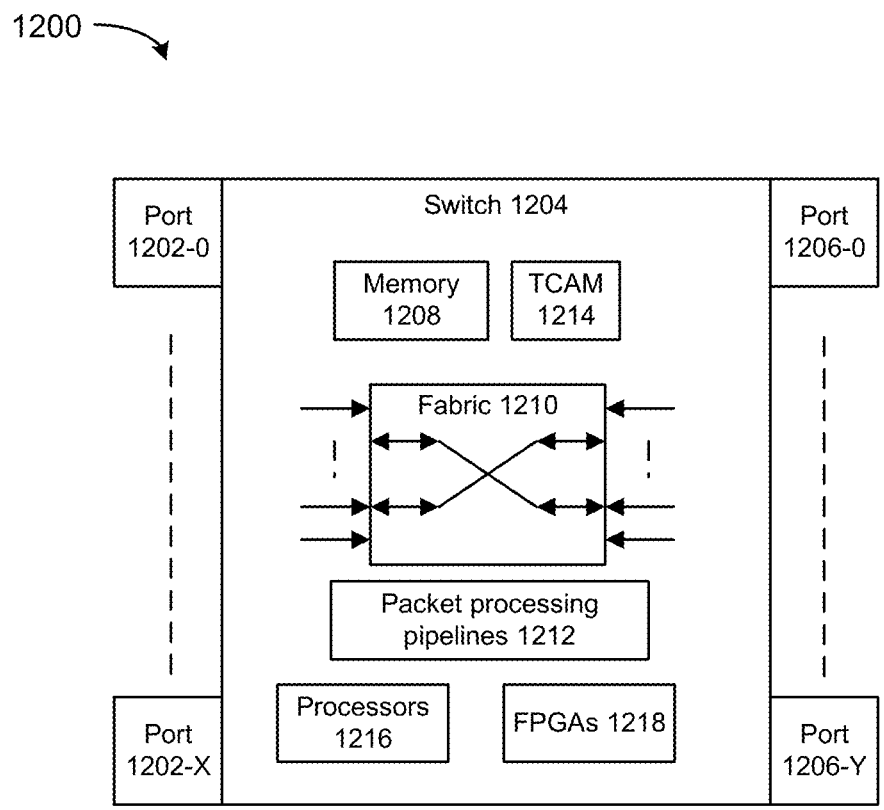
FIG. 12A depicts an example switch.

FIG. 12A depicts an example switch. Various embodiments can be used in or with the switch to determine and transmit information used to set a transmit rate or window of a sender network device in accordance with embodiments described herein. Switch 1204 can route packets or frames of any format or in accordance with any specification from any port 1202-0 to 1202-X to any of ports 1206-0 to 1206-Y (or vice versa). Any of ports 1202-0 to 1202-X can be connected to a network of one or more interconnected devices. Similarly, any of ports 1206-0 to 1206-X can be connected to a network of one or more interconnected devices.

In some examples, switch fabric 1210 can provide routing of packets from one or more ingress ports for processing prior to egress from switch 1204. Switch fabric 120 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 1208 can be configured to store packets received at ports prior to egress from one or more ports. Packet processing pipelines 1212 can determine which port to transfer packets or frames to using a table that maps packet characteristics with an associated output port. Packet processing pipelines 1212 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 1212 can implement access control list (ACL) or packet drops due to queue overflow. Packet processing pipelines 1212 can be configured to add operation and telemetry data concerning switch 1204 to a packet prior to its egress.

Configuration of operation of packet processing pipelines 1212, including its data plane, can be programmed using P4, C, Python, Broadcom Network Programming Language (NPL), or x86 compatible executable binaries or other executable binaries. Processors 1216 and FPGAs 1218 can be utilized for packet processing or modification.

Figure 12B:
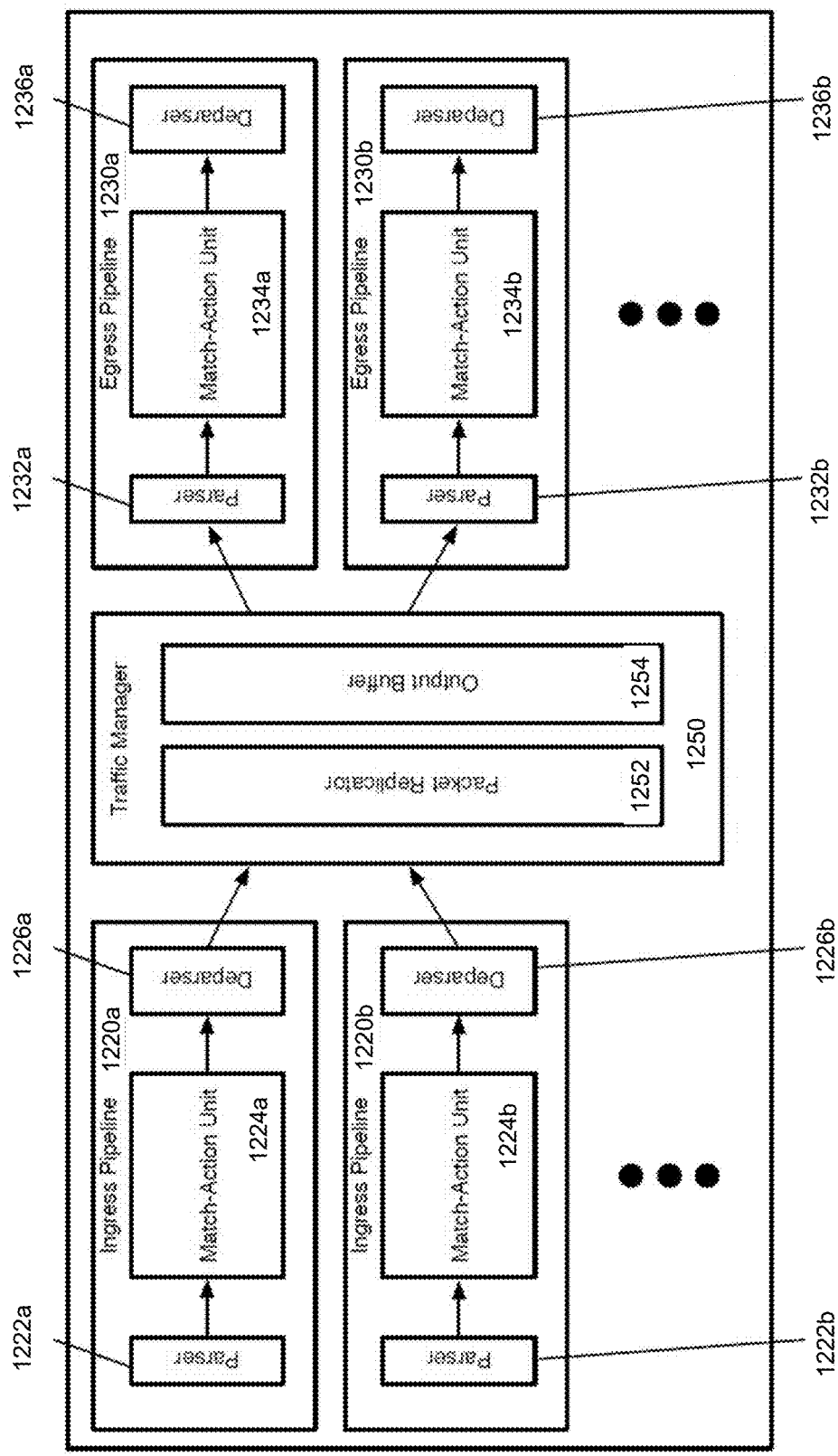
FIG. 12B depicts an example forwarding element.

FIG. 12B depicts an example network forwarding system that can be used as a switch or router. For example, FIG. 12B illustrates several ingress pipelines 1220, a traffic management unit (referred to as a traffic manager) 1250, and several egress pipelines 1230. Though shown as separate structures, in some embodiments the ingress pipelines 1220 and the egress pipelines 1230 can use the same circuitry resources. In some embodiments, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

In some examples, in response to receiving a packet, the packet is directed to one of the ingress pipelines 1220 where an ingress pipeline which may correspond to one or more ports of a hardware forwarding element. After passing through the selected ingress pipeline 1220, the packet is sent to the traffic manager 1250, where the packet is enqueued and placed in the output buffer 1254. In some embodiments, the ingress pipeline 1220 that processes the packet specifies into which queue the packet is to be placed by the traffic manager 1250 (e.g., based on the destination of the packet or a flow identifier of the packet). The traffic manager 1250 then dispatches the packet to the appropriate egress pipeline 1230 where an egress pipeline may correspond to one or more ports of the forwarding element. In some embodiments, there is no necessary correlation between which of the ingress pipelines 1220 processes a packet and to which of the egress pipelines 1230 the traffic manager 1250 dispatches the packet. That is, a packet might be initially processed by ingress pipeline 1220b after receipt through a first port, and then subsequently by egress pipeline 1230a to be sent out a second port, etc.

A least one ingress pipeline 1220 includes a parser 1222, a match-action unit (MAU) 1224, and a deparser 1226. Similarly, egress pipeline 1230 can include a parser 1232, a MAU 1234, and a deparser 1236. The parser 1222 or 1232, in some embodiments, receives a packet as a formatted collection of bits in a particular order, and parses the packet into its constituent header fields. In some examples, the parser starts from the beginning of the packet and assigns header fields to fields (e.g., data containers) for processing. In some embodiments, the parser 1222 or 1232 separates out the packet headers (up to a designated point) from the payload of the packet, and sends the payload (or the entire packet, including the headers and payload) directly to the deparser without passing through the MAU processing.

The MAU 1224 or 1234 can perform processing on the packet data. In some embodiments, the MAU includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, using MAU, telemetry data for the forwarding element can be gathered and sent to another network device, switch, router, or endpoint receiver or transmitter in one or more packets.

The deparser 1226 or 1236 can reconstruct the packet using the PHV as modified by the MAU 1224 or 1234 and the payload received directly from the parser 1222 or 1232. The deparser can construct a packet that can be sent out over the physical network, or to the traffic manager 1250. In some embodiments, the deparser can construct this packet based on data received along with the PHV that specifies the protocols to include in the packet header, as well as its own stored list of data container locations for each possible protocol's header fields.

Traffic manager 1250 can include a packet replicator 1252 and output buffer 1254. In some embodiments, the traffic manager 1250 may include other components, such as a feedback generator for sending signals regarding output port failures, a series of queues and schedulers for these queues, queue state analysis components, as well as additional components. The packet replicator 1252 of some embodiments performs replication for broadcast/multicast packets, generating multiple packets to be added to the output buffer (e.g., to be distributed to different egress pipelines).

The output buffer 1254 can be part of a queuing and buffering system of the traffic manager in some embodiments. The traffic manager 1250 can provide a shared buffer that accommodates any queuing delays in the egress pipelines. In some embodiments, this shared output buffer 1254 can store packet data, while references (e.g., pointers) to that packet data are kept in different queues for each egress pipeline 1230. The egress pipelines can request their respective data from the common data buffer using a queuing policy that is control-plane configurable. When a packet data reference reaches the head of its queue and is scheduled for dequeuing, the corresponding packet data can be read out of the output buffer 1254 and into the corresponding egress pipeline 1230. In some embodiments, packet data may be referenced by multiple pipelines (e.g., for a multicast packet). In this case, the packet data is not removed from this output buffer 1254 until all references to the packet data have cleared their respective queues.

Figure 13:
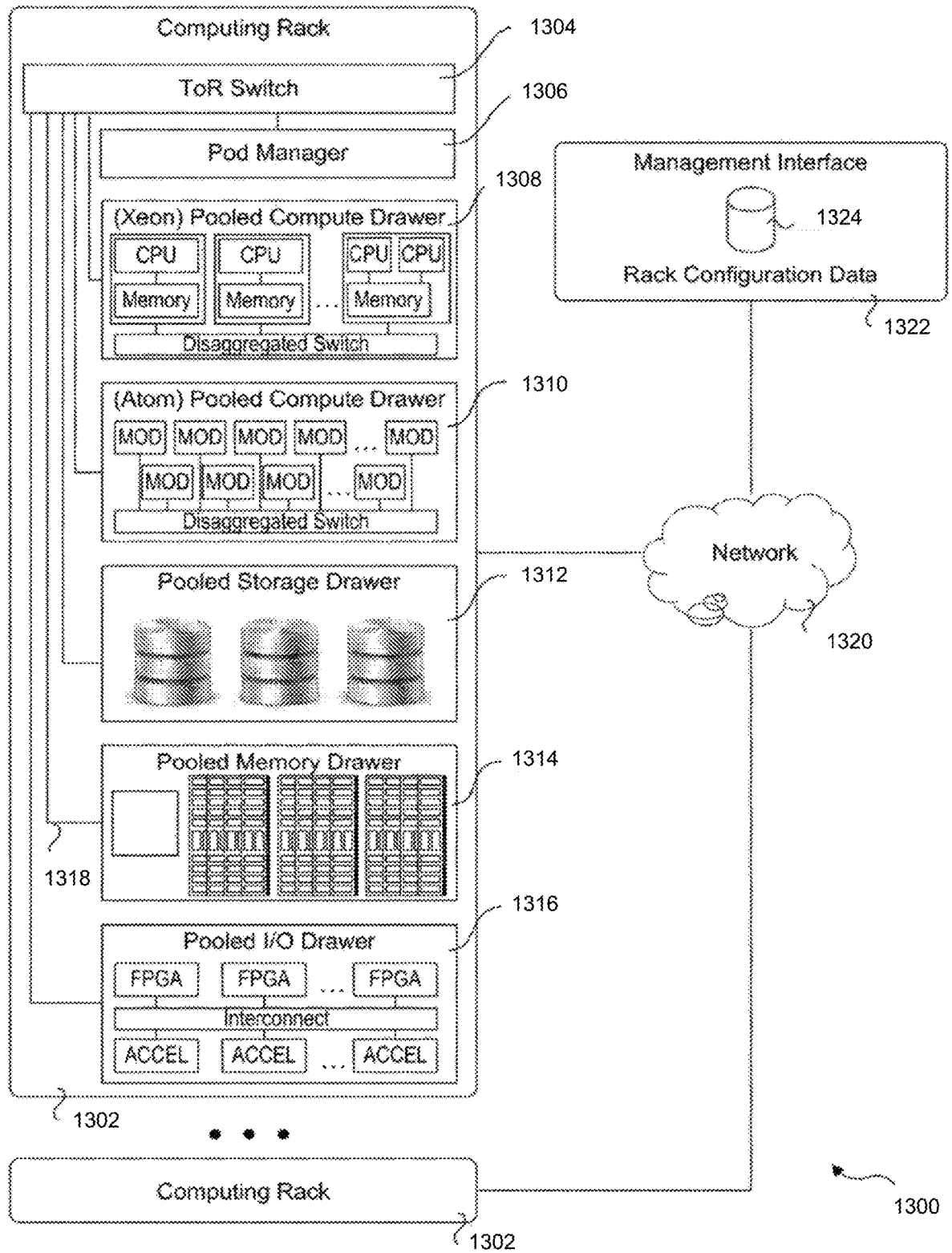
FIG. 13 depicts an environment.

FIG. 13 depicts an environment 1300 includes multiple computing racks 1302, some including a Top of Rack (ToR) switch 1304, a pod manager 1306, and a plurality of pooled system drawers. Various embodiments can be used in or with the switch to determine transmit rate or window for a transmitter network interface at an endpoint receiver in accordance with embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1308, and Intel® ATOM™ pooled compute drawer 1310, a pooled storage drawer 1312, a pooled memory drawer 1314, and a pooled I/O drawer 1316. Some of the pooled system drawers is connected to ToR switch 1304 via a high-speed link 1318, such as an Ethernet link and/or a Silicon Photonics (SiPh) optical link.

Multiple of the computing racks 1302 may be interconnected via their ToR switches 1304 (e.g., to a pod-level switch or data center switch), as illustrated by connections to a network 1320. In some embodiments, groups of computing racks 1302 are managed as separate pods via pod manager(s) 1306. In one embodiment, a single pod manager is used to manage racks in the pod. Alternatively, distributed pod managers may be used for pod management operations.

Environment 1300 further includes a management interface 1322 that is used to manage various aspects of the environment. This includes managing rack configuration, with corresponding parameters stored as rack configuration data 1324.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a method comprising: at a network device: receiving a packet; determining transmit rate-related information for a sender network device that sent the packet based at least on operational and telemetry information accumulated in the received packet; and sending a portion of the transmit rate-related information to the sender network device.

Example 2 includes any example, wherein the network device comprises an intermediate switch or endpoint receiver.

Example 3 includes any example, wherein the operational and telemetry information accumulated in the received packet is provided by one or more intermediate switch devices or forwarding elements in a path from the sender network device to the network device.

Example 4 includes any example, wherein the operational and telemetry information accumulated in the received packet comprises a worst congestion level at a switch in a path from the sender network device to the network device.

Example 5 includes any example, wherein the network device operates consistent with High Precision Congestion Control (HPCC).

Example 6 includes any example, wherein the transmit rate-related information is for one or more packets, one or more flows, or one or more remote direct memory access (RDMA) queue pairs.

Example 7 includes any example, wherein the sending a portion of the transmit rate-related information to the sender network device comprises sending less than an entirety of the operational and telemetry information accumulated in the received packet and occurs based on occurrence of a round trip time or threshold change in congestion level.

Example 8 includes any example, wherein the sending a portion of the transmit rate-related information to the sender network device comprises sending a notification packet (np) from the network device to the sender network device, wherein the np includes the transmit rate-related information.

Example 9 includes any example, and includes: receiving a second packet, wherein a transmit rate of the second packet is based on the transmit rate-related information.

Example 10 includes any example, and includes an apparatus that includes: a network agent, when operational, to: receive a packet, determine transmit rate-related information for a sender network device based at least on operational and telemetry information accumulated in the received packet, and transmit the transmit rate-related information to the sender network device.

Example 11 includes any example, wherein the network agent comprises a network device coupled to a server, a server, or a network device.

Example 12 includes any example, wherein the operational and telemetry information comprises: telemetry information generated by at least one network device in a path from the sender network device to the network agent.

Example 13 includes any example, wherein the transmit rate-related information is for one or more packets, one or more flows, or one or more remote direct memory access (RDMA) queue pairs.

Example 14 includes any example, wherein to transmit the transmit rate-related information to the sender network device, the network agent is to send a notification packet (np) to the sender network device, wherein the np includes the transmit rate-related information.

Example 15 includes any example, and includes an apparatus comprising: a network interface controller, when operational, is to: transmit packets for one or more flows or remote direct memory access (RDMA) queue pairs at a transmit rate, wherein the transmit rate is based on received transmit rate-related information from an endpoint receiver network device.

Example 16 includes any example, wherein the received transmit rate-related information comprises a window size and wherein the network interface controller, when operational, is to determine the transmit rate for the one or more flows or RDMA queue pairs based at least on the window size sent by the endpoint receiver network device.

Example 17 includes any example, wherein the network interface controller, when operational, is to apply bandwidth allocation to multiple flows based on a number of actual flows through a congested path identified by the endpoint receiver network device.

Example 18 includes any example, and includes a server, rack, or data center communicatively coupled to the network interface controller, wherein the server, rack, or data center is to configure the network interface controller to determine the transmit rate based on received transmit rate-related information from the endpoint receiver network device.

Example 19 includes any example, and includes at least one computer-readable medium, comprising instructions stored thereon, that if executed by at least one processor, cause the at least one processor to: configure a network interface controller to transmit packets for one or more flows or remote direct memory access (RDMA) queue pairs at a transmit rate, wherein the transmit rate is based on received transmit rate-related information from an endpoint receiver network device.

Example 20 includes any example, and includes instructions stored thereon, that if executed by at least one processor, cause the at least one processor to: configure the network interface controller to apply bandwidth allocation to multiple flows based on a number of actual flows through a congested path identified by the endpoint receiver network device.

What is claimed is:

1. A method comprising:
at a network device:
receiving a packet;
determining transmit rate-related information for a sender network device that sent the packet based at least on operational and telemetry information accumulated in the received packet; and
sending a portion of the transmit rate-related information to the sender network device, wherein the transmit rate-related information comprises data to adjust a transmission rate, of the sender network interface device, of packets of at least one flow;
wherein:
the operational and telemetry information accumulated in the received packet is to be accumulated, at least in part, using forwarding element packet processing pipeline match-action unit circuitry; and
the operational and telemetry information accumulated in the received packet comprises a congestion level at a single switch of multiple intervening switches in a path from the sender network device to the network device.

2. The method of claim 1, wherein the network device comprises an intermediate switch or endpoint receiver.

3. The method of claim 1, wherein the operational and telemetry information accumulated in the received packet is provided, at least in part, by one or more intermediate switch devices or forwarding elements in a path from the sender network device to the network device.

4. The method of claim 1, wherein the network device operates consistent with High Precision Congestion Control (HPCC).

5. The method of claim 1, wherein the transmit rate-related information is for one or more packets, one or more flows, or one or more remote direct memory access (RDMA) queue pairs.

6. The method of claim 1, wherein the sending a portion of the transmit rate-related information to the sender network device comprises sending a notification packet (np) from the network device to the sender network device, wherein the np includes the transmit rate-related information.

7. The method of claim 1, comprising:
receiving a second packet from the sender network interface device, wherein a transmit rate of the second packet is based on the transmit rate-related information.

8. An apparatus comprising:
a network interface device, when in operation, to perform operations comprising:
receive a packet,
determine transmit rate-related information for a sender network device based at least on operational and telemetry information accumulated in the received packet, and
transmit the transmit rate-related information to the sender network device, wherein the transmit rate-related information comprises data to adjust a transmission rate, of the sender network interface device, of packets of at least one flow;

wherein:
the operational and telemetry information accumulated in the received packet is to be accumulated, at least in part, using forwarding element packet processing pipeline match-action unit circuitry; and
less than an entirety of the operational and telemetry information is accumulated in the received packet and the received packet is based on a round trip time or threshold change in congestion level.

9. The apparatus of claim 8, wherein the network interface device is coupled to a server or a network device.

10. The apparatus of claim 8, wherein the operational and telemetry information comprises: telemetry information generated by at least one network device in a path from the sender network device to the network interface device.

11. The apparatus of claim 8, wherein the transmit rate-related information is for one or more packets, one or more flows, or one or more remote direct memory access (RDMA) queue pairs.

12. The apparatus of claim 8, wherein to transmit the transmit rate-related information to the sender network device, the network interface device is to send a notification packet (np) to the sender network device, wherein the np includes the transmit rate-related information.

13. An apparatus comprising:
a network interface controller, when in operation, that is to perform operations comprising:
transmit packets for one or more flows or remote direct memory access (RDMA) queue pairs at a transmit rate, wherein the transmit rate is based on received transmit rate-related information from an endpoint receiver network device, wherein the transmit rate-related information from the endpoint receiver network device comprises data to adjust a transmission rate of the network interface controller, of packets of at least one flow, and wherein the data comprises one or more of: a transmit rate for at least one flow, window size (W), or an additive-increase parameter (WAI);
wherein:
the transmit rate-related information is to be generated based, at least in part, upon accumulated operational and telemetry information;
the accumulated operational and telemetry information is to be accumulated, at least in part, using forwarding element packet processing pipeline match-action unit circuitry; and
the operational and telemetry information accumulated comprises a congestion level at a single switch of multiple intervening switches in a path from a sender network device to another network device.

14. The apparatus of claim 13, wherein the received transmit rate-related information comprises a window size and wherein the network interface controller, when in the operation, is to determine the transmit rate for the one or more flows or RDMA queue pairs based at least on the window size sent by the endpoint receiver network device.

15. The apparatus of claim 13, wherein the network interface controller, when in the operation, is to apply bandwidth allocation to multiple flows based on a number of actual flows through a congested path identified by the endpoint receiver network device.

16. The apparatus of claim 13, comprising a server, rack, or data center communicatively coupled to the network interface controller, wherein the server, rack, or data center is to configure the network interface controller to determine the transmit rate based on received transmit rate-related information from the endpoint receiver network device.

17. At least one non-transitory computer-readable medium, comprising instructions stored thereon, that if executed by at least one processor, cause the at least one processor to perform operations comprising:

configure a network interface controller to transmit packets for one or more flows or remote direct memory access (RDMA) queue pairs at a transmit rate, wherein the transmit rate is based on received transmit rate-related information from an endpoint receiver network device, wherein the transmit rate-related information from the endpoint receiver network device comprises data to adjust a transmission rate of the network interface controller, of packets of at least one flow, and wherein the data comprises one or more of: a transmit rate for at least one flow, windowsize (W), or an additive-increase parameter (WAI);

wherein:
the transmit rate-related information is to be generated based, at least in part, upon accumulated operational and telemetry information;
the accumulated operational and telemetry information is to be accumulated, at least in part, using forwarding element packet processing pipeline match-action unit circuitry; and
less than an entirety of the operational and telemetry information is accumulated in a received packet and the received packet is based on a round trip time or threshold change in congestion level.

18. The at least one computer-readable medium of claim 17, comprising instructions stored thereon, that if executed by at least one processor, cause the at least one processor to perform other operations comprising:

configure the network interface controller to apply bandwidth allocation to multiple flows based on a number of actual flows through a congested path identified by the endpoint receiver network device.

19. The apparatus of claim 8, wherein the data comprises one or more of: a transmit rate for at least one flow, window size (W), or an additive-increase parameter (WAI) and wherein receipt of the data by the sender network interface device is to cause the sender network interface device to adjust the transmission rate of the packets of at least one flow.

20. The apparatus of claim 8, wherein the data comprises a number of different flows with associated packets transmitted through a path of one or more switches to an endpoint receiver to cause the sender network interface device to allocate transmission bandwidth based on the number of different flows to provide for fair bandwidth allocation among different flows.

\* \* \* \* \*